E. BELL & W. J. WILKINS.
TRUCK.
APPLICATION FILED FEB. 16, 1912.

1,050,602.

Patented Jan. 14, 1913.

Witnesses

Inventors
Earl Bell,
William J. Wilkins.
By Victor J. Evans
Attorney

UNITED STATES PATENT OFFICE.

EARL BELL AND WILLIAM J. WILKINS, OF FULTON, ILLINOIS.

TRUCK.

1,050,602.  Specification of Letters Patent.  Patented Jan. 14, 1913.

Application filed February 16, 1912. Serial No. 677,999.

*To all whom it may concern:*

Be it known that we, EARL BELL and WILLIAM J. WILKINS, citizens of the United States, residing at Fulton, in the county of Whiteside and State of Illinois, have invented new and useful Improvements in Trucks, of which the following is a specification.

This invention relates to trucks and the principal object of the invention is to provide a simple and efficient truck for ware houses, storage plants, freight depots, and the like.

Further objects of this invention will appear as the following specific description is read in connection with the accompanying drawing, which forms a part of this application, and in which:—

Figure 1:
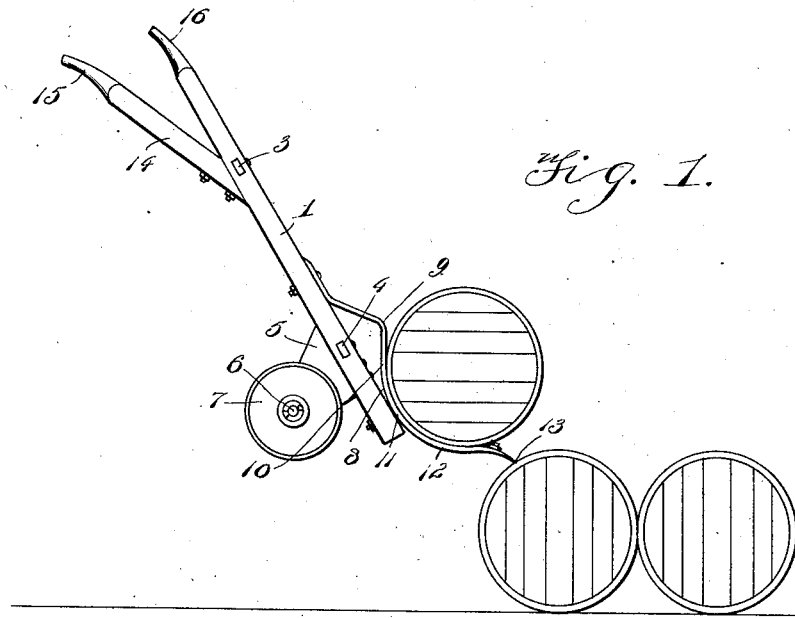
Figure 2:
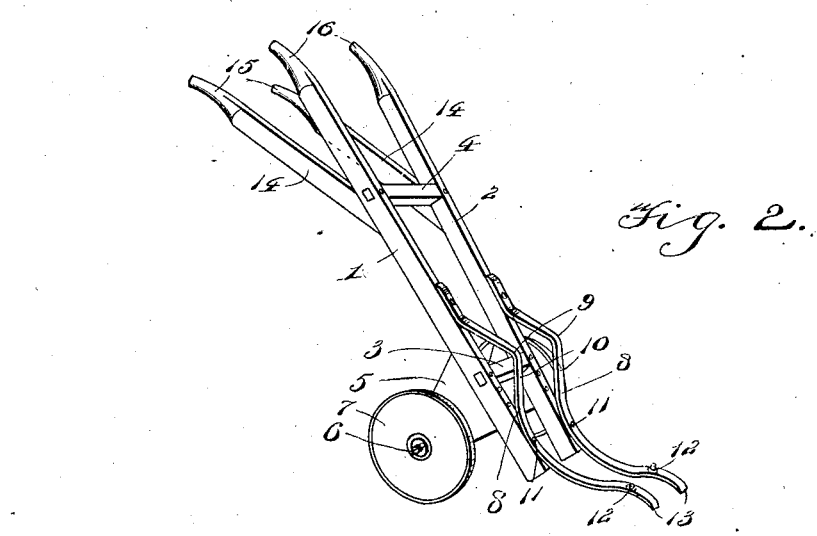

Figure 1 is a side elevation showing the application of the device. Fig. 2 is a perspective view.

Referring more particularly to the drawing, 1 and 2 represents the side members of the truck which are connected together by brake bars 3 and 4. Each side member is provided with a depending axle support 5 in which an axle 6 is properly secured and mounted upon the axle are the wheels 7. Secured to the upper side of the side members are irons 8 which are separated from the side members, as shown at 9 to produce abutting shoulders 10. Beyond the attachment of the irons at a point 11, they are curved upwardly into barrel or box supporting arms 12, whose outer ends are oppositely bent and are sharpened, as shown at 13 for a purpose to be hereinafter described.

Arranged in vertical alinement with the side members and extending downwardly on a diagonal line therefrom, and rearwardly, are bars 14 having handles 15 formed on their outer end similar to the handles 16 formed on the rear ends of the side members. These bars 14 are adapted to act as supports for the truck when lying down and to obtain a greater leverage in raising the truck, as will be hereinafter described.

The truck is specifically designed for carrying boxes or barrels from place to place and for arranging them in tiers. The barrel is placed on the truck between the upturned ends of the arms and the shoulders 10 and carried to the point desired and dumped in the usual manner. When one tier of the barrels has been laid and it is desired to put barrels on top of them to form a second tier, the sharpened end of the arms is engaged upon the top of the end barrel of the first tier and the lower handles 15 grasped and elevated, as shown in Fig. 1, so as to raise the entire truck from the ground and with it the barrel carried thereby. When the truck is raised to a sufficient degree, the barrel carried thereby can be discharged upon the top of the barrels in the first tier. This describes only one manner of using the truck as it can be readily operated to discharge barrels into a wagon or upon a raised platform, or the like, the sharpened downturned ends of the arms readily biting into the platform, or wagon or barrel so as to hold the arms against displacement from their support.

What is claimed is:—

1. In a truck, main handle members, auxiliary handle members extending rearwardly and downwardly on an acute angle therefrom and secured thereto, raised shoulders formed on the body, and upwardly curved arms projecting outwardly from the body and having reversely curved ends.

2. In a truck, main handle members, auxiliary handle members secured to the underneath side thereof and extending rearwardly and downwardly therefrom, said auxiliary handle members adapted to form a rest or support for the truck when lowered, wheels supporting said main handle members, and article supporting members mounted upon the side members and separated therefrom to produce limiting shoulders, said article supporting members extending beyond the side members on an upward curve and having their outer ends reversely curved into sharpened engaging members.

In testimony whereof we affix our signatures in presence of two witnesses.

EARL BELL.
WILLIAM J. WILKINS.

Witnesses:
DENNIS NANIGA,
ALBERT M. BLODGETT.

Copies of this patent may be obtained for five cents each, by addressing the "Commissioner of Patents, Washington, D. C."